Sept. 15, 1959 J. A LOGAN ET AL Re. 24,698

HEATING MEANS FOR BILLET CONTAINERS OF METAL EXTRUSION PRESSES

Original Filed Nov. 30, 1953

INVENTORS
John A. Logan
Eduard K.L. Haffner
BY Slough & Slough
Their ATTORNEYS.

United States Patent Office

Re. 24,698
Reissued Sept. 15, 1959

24,698

HEATING MEANS FOR BILLET CONTAINERS OF METAL EXTRUSION PRESSES

John A. Logan, Youngstown, Ohio, and Eduard K. L. Haffner, Bournemouth, England

Original No. 2,792,482, dated May 14, 1957, Serial No. 395,228, November 30, 1953. Application for reissue May 12, 1958, Serial No. 735,096

5 Claims. (Cl. 219—10.71)

Matter enclosed in heavy brackets [ ] appears in the original patent but forms no part of this reissue specification; matter printed in italics indicates the additions made by reissue.

Billet containers of metal extrusion presses are generally equipped with heating means in order to maintain at the required temperature the billets which are extruded from the container. These billets are preheated before being placed in the container by other heating means, such as those disclosed in United States Letters Patent to Lackner et al. No. 2,676,234 dated April 20, 1954.

In the case of some metals, among them light metals and their alloys, the range of temperatures which are most suitable for their extrusion is comparatively narrow, and close control of the container heating means is therefore necessary. This requirement is best satisfied by electric heating means. Whilst these were formerly mostly of the resistance type, it has also been proposed to equip the containers of metal extrusion presses with electric heaters of the induction type. However, none of such proposals has so far been satisfactory.

For reasons of economy and efficiency, it is desirable to produce the heat as closely as possible to the billet chamber of the container.

It is an object of the invention to provide improved electrical heating means of the induction type for the billet containers of metal extrusion presses.

The billet containers of metal extrusion presses consist generally of a number of parts, substantially in the form of cylindrical shells, which are arranged one inside the other concentrically to the axis of the container; they are firmly secured to each other by shrinking or otherwise, in order to withstand the high mechanical pressures to which they are subjected during the extrusion of the billets. In some instances, a container comprises only two such parts, a mantle or casing, and a liner which forms the wall of the billet chamber. As the liner is exposed to continuous wear and has, therefore, to be replaced from time to time, it is generally made as thin as possible and compatible with the requirements of mechanical strength, and its thickness is therefore small compared with that of the mantle or casing. In some instances, the container consists of three parts, a liner holder being interposed between the mantle or casing and the liner, the thickness of the liner holder being substantially the same as that of the liner.

The invention is particularly applicable, although not restricted, to containers which consist of a mantle or casing and a liner only.

According to the invention, the electric heating means for a billet container of a metal extrusion press comprise one or more induction coils accommodated in a recess or recesses provided in a wall of one of the aforementioned container parts, the wall being co-axial with the billet chamber of the container. The heating means according to the invention are thus located between casing and liner, or casing and liner holder, and in either case in close proximity to the billet chamber.

This arrangement results in concentrating the magnetic flux inside the liner and also partly inside the billet chamber and in reducing appreciably the magnetic flux through the outer parts of the container, in particular the mantle or casing, whereby the efficiency of the heating means is greatly improved, with a consequent reduction of the electric energy required.

The coil or coils forming the electric inductor have preferably spiral turns co-axial to the billet chamber. Accordingly, the recesses or grooves accommodating the turns are of spiral or helical shape. The machining of these recesses or grooves can be easily carried out.

According to the invention, the recess or recesses provided for the accommodation of the heating coil or coils are preferably located, in the case of two-part containers in the casing, and in the case of three-part containers in the liner holder, without, however, being limited thereto.

The concentration of the heating effect on the internal parts of the containers with the external parts remaining practically cold, has the result that the internal parts alone will undergo a thermal expansion when the heating coils are energized. Thus, in normal operation of the heating means, a shrinking of the internal parts into the external parts will take place to the same degree as that so far achieved during the assembly of the container. This makes it possible to dispense to a large extent, if not entirely, with the special shrinking operation to which the container parts had formerly to be subjected at the time of their assembly. This is an important additional advantage of the invention.

Several embodiments of the invention are shown by way of example in the accompanying drawings, in which.

Figure 1:
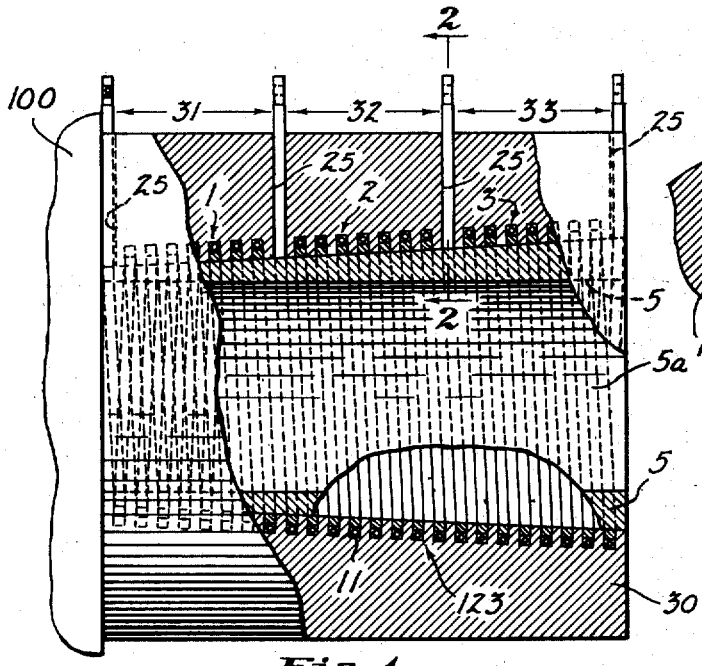
Fig. 1 is a section through a two-part container provided with heating means according to the invention.

The billet container shown in Fig. 1 comprises an external part in the form of a mantle or casing 30, and an internal part in the form of a liner 5, the liner having a straight-through bore of uniform diameter, defining the billet chamber 5a. The billet chamber is, at both its ends, slightly flared, to provide a seat for the conventional extrusion die, not shown here. In the embodiment shown, the liner 5 has a tapered fit in the mantle or casing 30, but this is not essential as the invention can also be applied to liners having a cylindrical fit in the mantle.

The liner 5 is usually made of high-grade alloy steel which must be of very high tensile strength, even when heated up to elevated temperatures, whilst the requirements for the mantle or casing are somewhat less exacting. For this reason, and also because it has to be renewed from time to time, the wall thickness of the liner 5 is small compared with that of the mantle or casing 30.

According to the invention, the interior wall of the bore of the mantle or casing is provided with recesses having in the embodiment shown the form of a helical or spiral groove 30b which is adapted to accommodate the convolutions or turns of one or more coils forming an electric inductor.

Figure 3:
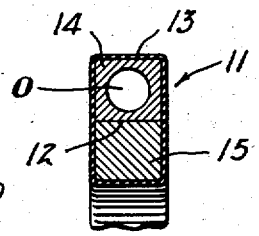
Fig. 3 is a transverse section of an insulated electrical conductor from which the heating coils may be formed.
Figure 5:
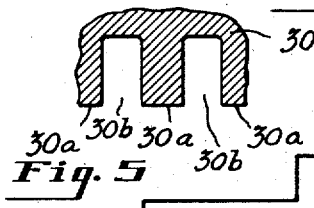
Fig. 5 shows on an enlarged scale a portion of a container part with recesses formed therein.

A conductor 11 for such a coil is shown in detail in Fig. 3, and comprises a base portion 15 which may be formed of a copper bar. Welded to the base portion at 12 is a tubular portion 14 forming a conduit O for a coolant. The conductor has an outer insulating wrapping 13.

The depth and cross-section of the spiral groove 30b is such that the conductor 11 can be tightly forced within, the conductor being preferably cemented in the groove by temperature-resistant material or otherwise.

The coil or coils are preferably embedded in the recess or recesses of the container parts in such a manner that they do not protrude radially over the surface of that part so as to permit its unobstructed axial movement relative to the adjacent part of the container.

The inductor may comprise a single coil winding which may be energized from one phase of a three-phase source. The preferred arrangement is, however, one shown in Fig. 4 and in which three separate coils 1, 2 and 3 are used which are fed through transformers 23, 22 and 21 from the mains 51, 52 and 53 of a three-phase source, through a set of switches 61, 62 and 63, operated by a solenoid 10 and through conductors 71, 72 and 73. Connected to the primary windings, 93, 92 and 91 of each transformer are tap switches 43, 42 and 41 which enable the voltage of each of the transformers to be independently regulated. For a complete disclosure of the electrical circuits shown in Fig. 4, reference may be made to the copending application of Bruce E. McArthur for Letters Patent, identified as Serial No. 303,342, filed in the United States Patent Office on July 29, 1952, now Patent No. 2,748,240.

Figure 2:
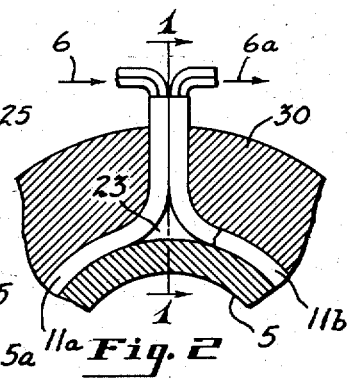
Fig. 2 is a section taken along line II—II of Fig. 1.

The coils 1, 2 and 3 are connected to their respective transformers 23, 22 and 21 through conductors 31, 32 and 33 respectively attached to the ends of the coils and accommodated in axially spaced-apart passageways 25 of the container mantle 30. As shown in Fig. 2, the passageways 37 in the middle of the mantle each accommodate a pair of conductors, one for each of a pair of adjacent coils. The conductors are covered with insulating material which may be of the same nature as the wrapping 13.

Figure 4:
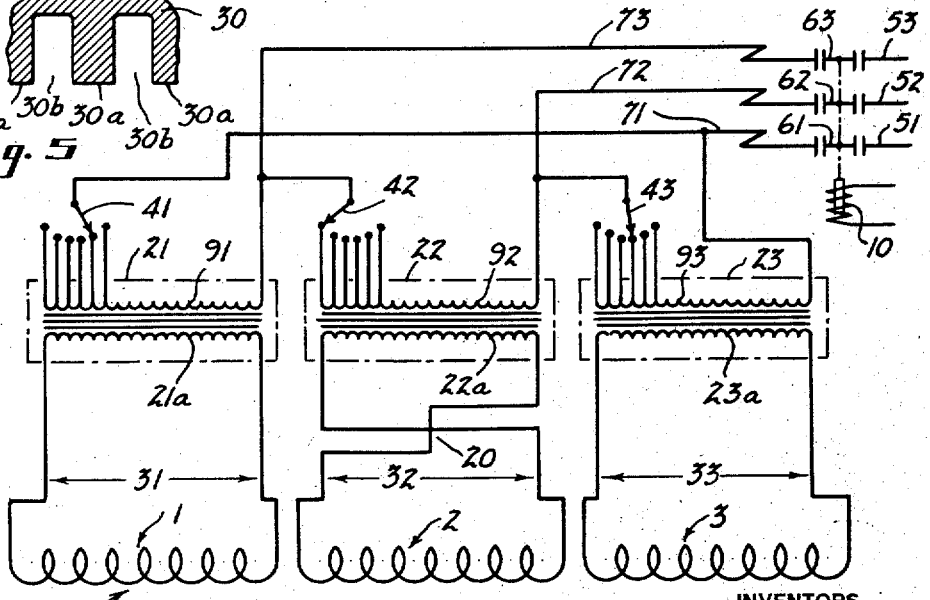
Fig. 4 is a diagram of electric circuits employed for energizing an electric inductor built into a container.

Each of the coils 1, 2 and 3 is fed by one of the phases from the three-phase source indicated by the mains 51, 52 and 53. As shown in Fig. 4, the conductors 32 of the centre coil 2 are transposed, whereby the phase difference between the magnetic fields of two adjacent coils is only 60° instead of 120°, thus minimizing the dispersal of magnetic lines of force in those regions where two adjacent coils face each other. In other words, the phase relationship between the three coils 1, 2 and 3 with the terminals 32 of the centre coil 2 transposed is similar to one between three successive phases of a six-phase system.

Whilst Fig. 4 shows three axially-aligned coils, it will be understood that the inductor may comprise any desired number of coils, and these may be energized in other ways than those shown in Fig. 4.

It is frequently desired to concentrate the heating effect at one or both ends of the billet chamber 5a, as more heat is lost at the ends of the container and the billet chamber than at the centres for obvious reasons; one way of achieving this result is to feed the outer coils with a stronger electric current than the centre coil, which may be attained by suitable regulation of the transformers 23, 22 and 21 by means of the tap switches 43, 42 and 41. A similar result can be achieved by giving the two outer coils a smaller number of turns than the centre coil, or by placing the turns of the two outer coils more closely together than those of the centre coil.

Similar results can also be obtained by providing coils at the two ends of the billet container only, leaving the middle part without any heating means. This arrangement is particularly suitable where the heating means comprises only two coils.

A thermo-couple element or any other thermoresponsive device may be applied to the parts of the container in which the heating means according to the invention are arranged.

The invention is not limited to the embodiments shown and described here, and a variety of other arrangements of the electric inductor within the container can be evolved within the scope of the invention, the main object remaining always the provision of an electric inductor in the proximity of the billet chamber of the container of a metal extrusion press.

What is claimed is:

1. The combination with a metal extrusion press, a billet container for maintaining a contained metal at a desired extrusion temperature, said container comprising a pair of stationary relatively telescoped tubular outer mantle and inner liner elements of which the liner element has an axial cylindrical bore affording a pair of opposite end openings, and an outer wall surface which is of frusto-conical form to cause the wall thickness of said liner to be progressively decreased to a substantial degree, proceeding from a first end of the liner to its longitudinally opposite end thereof, said mantle having an inner wall surface which is longitudinally tapered complimentary to the [tapered] *taper* of the outer wall of said liner, and said interior mantle wall being provided with a [spirally] *spiral* recess, spirally formed induction coil conductor means embedded in said mantle recess, the inner wall surfaces of said mantle being compressively tightly interfitted with the outer wall surfaces of said liner, and electrical means for communicating alternating current to said conductor means to energize the same, said container being secured by that one of its longitudinal ends whereat said liner walls are of least thickness, and where said mantle walls are of greatest thickness, to the extrusion press die openings, to dispose the liner bore opening at said end in fluid-tight relation to the extrusion die openings, through which the material of a heated metal billet, disposed in said liner, may be forced by movement of a ram projected within the said first end opening of said liner.

2. The billet container substantially as set forth in claim 1, characterized by the wall of said mantle element being substantially thicker than said liner element, and by said mantle and liner elements being thermally shrunk-fitted tightly together by first causing the temperature of the mantle element to exceed that of the liner element during assembly of said liner element within the bore of said mantle element.

*3. The combination with a metal extrusion press, a billet container for maintaining a contained metal at a desired extrusion temperature, said container comprising a pair of stationary relatively telescoped tubular outer mantle and inner liner elements of which the liner element has an axial cylindrical bore affording a pair of opposite end openings, said interior mantle wall being provided with a spiral recess, spirally formed induction coil conductor means embedded in said mantle recess, the inner wall surfaces of said mantle being progressively tightly interfitted with the outer wall surfaces of said liner, and electrical means for communicating alternating current to said conductor means to energize the same, said container being secured by one of its longitudinal ends to the extrusion press die openings to dispose the liner bore opening at said end in fluid-tight relation to the extrusion die openings, through which the material of a heated metal billet, disposed in said liner, may be forced, a ram projected within the said first end opening of said liner adapted to force said material through said extrusion die openings.*

*4. The billet container substantially as set forth in claim 3, characterized by the wall of said mantle element being substantially thicker than said liner element, and by said mantle and liner elements being thermally shrunk-fitted tightly together by first causing the temperature of the mantle element to exceed that of the liner*

*element during assembly of said liner element within the bore of said mantle element.*

*5. The combination with a metal extrusion press, a billet container for maintaining a contained metal at a desired extrusion temperature, said container comprising a pair of stationary relatively telescoped tubular outer mantle and inner liner elements of which the liner element has an axial cylindrical bore affording a pair of opposite end openings, said interior mantle wall being provided with a spiral recess, spirally formed induction coil conductor means embedded in said mantle recess, the inner wall surfaces of said mantle being compressively tightly interfitted with the outer wall surfaces of said liner, and electrical means for communicating alternating current to said conductor means to energize the same, said container being secured by one of its longitudinal ends to the extrusion press die openings, to dispose the liner bore opening at said end in fluid-tight relation to the extrusion die openings, through which the material of*

*a heated metal billet, disposed in said liner, may be forced.*

References Cited in the file of this patent or the original patent

UNITED STATES PATENTS

| | | |
|---|---|---|
| 1,885,045 | Bennett | Oct. 25, 1932 |
| 1,943,802 | Northrup | Jan. 16, 1934 |
| 1,981,632 | Northrup | Nov. 20, 1934 |
| 1,987,458 | Adams | Jan. 8, 1935 |
| 2,182,819 | Pisarev | Dec. 12, 1939 |
| 2,229,680 | Somes | Jan. 28, 1941 |
| 2,365,021 | Strickland | Dec. 12, 1944 |
| 2,452,197 | Kennedy | Oct. 26, 1948 |
| 2,461,765 | Olt | Feb. 15, 1949 |
| 2,604,577 | Strickland et al. | July 22, 1952 |
| 2,669,647 | Segsworth | Feb. 16, 1954 |

FOREIGN PATENTS

| | | |
|---|---|---|
| 767,150 | Germany | Dec. 6, 1951 |